United States Patent
Jin (10) Patent No.: US 10,042,494 B2
(45) Date of Patent: Aug. 7, 2018

(54) ARRAY SUBSTRATE, TOUCH DISPLAY PANEL AND TOUCH DISPLAY DEVICE

(71) Applicants: Shanghai AVIC OPTO Electronics Co., Ltd., Shanghai (CN); Tianma Micro-Electronics Co., Ltd., Shenzhen (CN)

(72) Inventor: Huijun Jin, Shanghai (CN)

(73) Assignees: Shanghai AVIC OPTO Electronics Co., Ltd., Shanghai (CN); Tianma Micro-Electronics Co., Ltd., Shenzhen (CN)

(*) Notice: Subject to any disclaimer, the term of this patent is extended or adjusted under 35 U.S.C. 154(b) by 22 days.

(21) Appl. No.: 15/141,796

(22) Filed: Apr. 28, 2016

(65) Prior Publication Data
US 2017/0083129 A1  Mar. 23, 2017

(30) Foreign Application Priority Data
Sep. 18, 2015  (CN) .......................... 2015 1 0600906

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04103* (2013.01); *G06F 2203/04111* (2013.01)

(58) Field of Classification Search
USPC ............ 345/87, 102, 173, 174, 30, 92, 107; 348/790
See application file for complete search history.

(56) References Cited

U.S. PATENT DOCUMENTS 8,310,435 B2 * 11/2012 Kang .................. G09G 3/3406
345/102
8,581,819 B2 * 11/2013 Choi .................... G09G 3/3655
345/92
8,643,817 B2 * 2/2014 Cho .................. G02F 1/134363
345/92

(Continued)

FOREIGN PATENT DOCUMENTS

CN  104698711 A  6/2015

*Primary Examiner* — Thuy Pardo
(74) *Attorney, Agent, or Firm* — Kilpatric Townsend & Stockton LLP (57) ABSTRACT

The present disclosure provides an array substrate, which includes: a substrate including a display region and a non-display region. The display region includes a plurality of gate lines, a plurality of data lines and a plurality of touch leads. The display region also includes a plurality of touch electrodes insulated from each other and electrically connected to the touch leads. The non-display region includes a first polar plate of a first capacitor and a second polar plate of the first capacitor, which are formed by overlapping the first polar plate of the first capacitor with the second polar plate of the first capacitor in a direction perpendicular to the substrate. The non-display region includes a first signal bus, which is partially overlapped with the first polar plate of the first capacitor and the second polar plate of the first capacitor in the direction perpendicular to the substrate.

14 Claims, 7 Drawing Sheets

(56) References Cited

U.S. PATENT DOCUMENTS

| | | | |
|---|---|---|---|
| 2007/0152952 A1* | 7/2007 | Kang | G09G 3/3406 |
| | | | 345/102 |
| 2008/0001873 A1* | 1/2008 | Choi | G09G 3/3655 |
| | | | 345/87 |
| 2008/0129706 A1* | 6/2008 | Kim | G06F 3/0412 |
| | | | 345/174 |
| 2009/0109351 A1* | 4/2009 | Shiomi | G02F 1/1347 |
| | | | 348/790 |
| 2010/0156779 A1* | 6/2010 | Park | G02F 1/167 |
| | | | 345/107 |
| 2012/0105347 A1* | 5/2012 | Pak | G06F 3/0412 |
| | | | 345/173 |
| 2016/0117023 A1* | 4/2016 | Hotelling | G09G 3/3648 |
| | | | 345/174 |

* cited by examiner

FIG.9

ARRAY SUBSTRATE, TOUCH DISPLAY PANEL AND TOUCH DISPLAY DEVICE

CROSS-REFERENCES TO RELATED APPLICATIONS

This application claims priority to a Chinese patent application No. 201510600906.1 filed on Sep. 18, 2015 and entitled "Array Substrate, Touch Display Panel and Touch Display Device", the disclosure of which is incorporated herein by reference in its entirety.

TECHNICAL FIELD

The present disclosure relates to the field of touch technologies, in particular to an array substrate, a touch display panel and a touch display device.

TECHNICAL BACKGROUND

Figure 1:
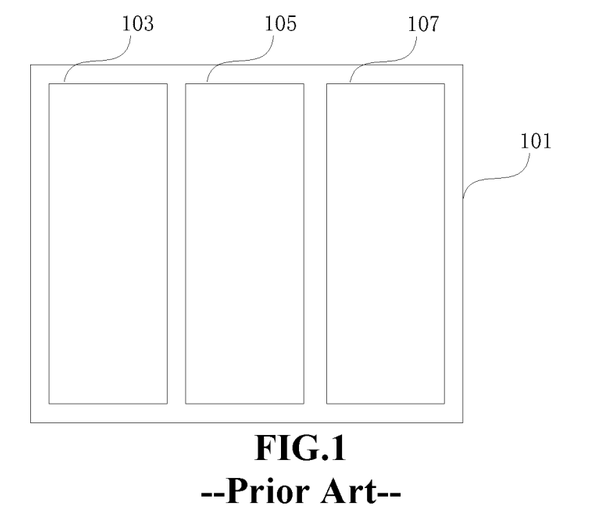
FIG. 1 is a schematic view showing an exemplary structure of a non-display region of a TFT-LCD touch panel in the related art.

Generally, a Thin Film Transistor Liquid Crystal Display (TFT-LCD) touch panel includes a display region and a non-display region located at the peripheral of the display region. FIG. 1 is a schematic view showing the structure of a non-display region of a TFT-LCD touch panel. Specifically, the non-display region 101 includes an Amorphous Silicon Gate (ASG) bus unit 103, where the ASG bus unit 103 includes a plurality of signal buses for providing signals for gate lines, data lines and touch wires in the display region; and further includes an ASG capacitor unit 105 and an ASG thin film transistor unit 107 for receiving signals provide by the ASG buss. In normal, the ASG capacitor unit 105 has at least one capacitor, and two polar plates of the capacitor are generally made of light-proof metal materials, respectively, and hence it will significantly affect the light transmittance of the non-display region of the touch panel, thereby further affecting the curing effect of adhesive for sealing frames on the non-display region. In addition, the two polar plates of the capacitor in the ASG capacitor unit 105 are made of same materials to the material of gate lines and data lines in the display region, respectively, and are then made by the same etching process. Further, the plurality of signal buses in the ASG bus unit 103 in general are made of same material to that of the gate lines in the display region and then are made by the same etching process, or the plurality of signal buses in the ASG bus unit 103 are made of same material to that of the data lines in the display region and then are made by the same etching process. However, no matter which processing is selected, it is against to realize a narrow-frame design.

If the metal capacitor in the ASG capacitor unit 105 is manufactured as hollow-out shape, the light transmittance is increased, but the area of the wirings is wasted, and it is difficult to achieve a narrow-frame in that way. If the two polar plates of the capacitor in the ASG capacitor unit 105 are replaced with transparent metals, such as the tin indium oxide, this simple replacement may lead to a poor curing of the adhesives for sealing the frame, since the light transmittance of the tin indium oxide relative to the ultraviolet light is not relatively large even though the tin indium oxide has a relative large light transmittance. Furthermore, with the improvement of the resolution of the touch panel, the amount of the signal buses in the ASG bus unit 103 is increased, and the area occupied by the arrangement of the buses is larger. As a result, it is also difficult to achieve a narrow-frame in that way.

To sum up, for those skilled in the related art, there is a need for an array substrate in which the resolution is ensured while realizing the narrow-frame design.

SUMMARY OF THE INVENTION

In view of the drawbacks existing in the related art, the present disclosure provides a resolution as follows:

Embodiments of the present disclosure can provide an array substrate, including:

a substrate including a display region and a non-display region, where the display region includes a plurality of gate lines, a plurality of data lines and a plurality of touch leads; and a plurality of touch electrodes insulated from each other and electrically connected to the touch leads respectively. The non-display region can include: a first polar plate of a first capacitor and a second polar plate of the first capacitor, with the first capacitor being formed by overlapping the first polar plate of the first capacitor with the second polar plate of the first capacitor in a direction perpendicular to the substrate; and a first signal bus, which is partially overlapped with the first polar plate of the first capacitor and the second polar plate of the first capacitor in the direction perpendicular to the substrate.

The present disclosure also provides a touch display panel including the aforementioned array substrate.

The present disclosure also provides touch display device including the aforementioned touch display panel.

In the array substrate provided, the buses is configured as a structure which is partially overlapped with the capacitor in the non-display region in a direction perpendicular to the substrate, thereby further realizing the narrow-frame mode under the condition that the resolution is guaranteed.

DESCRIPTION OF DRAWINGS

In order to more clearly illustrate technical solutions in embodiments of the present disclosure, accompanying drawings used in the embodiments will be introduced briefly below. Obviously, accompanying drawings described below are merely some examples of the disclosure, and other accompanying drawings can be further obtained according to the accompanying drawings without any creative work for those ordinary skilled in the art.

DETAILED DESCRIPTION OF THE PREFERRED EMBODIMENTS

The present disclosure will be described clearly in combination with the accompanying drawings and the embodiments in the present disclosure. It should be understood that the embodiments described herein are only part of embodiments. Based on the embodiments described in the present disclosure, other embodiments, obtained without any creative work, belong to the scope sought to be protected in the present disclosure.

Figure 2:
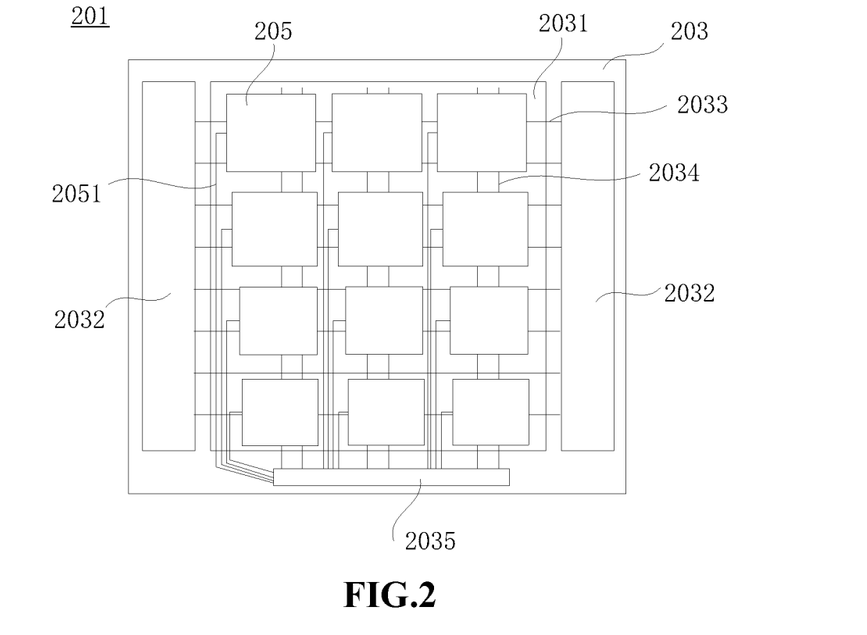
FIG. 2 is a top view of an array substrate according to an embodiment of the present disclosure.

FIG. 2 is a top view of an array substrate according to an embodiment of the present disclosure. As shown in FIG. 2, an array substrate 201 includes a substrate 203, which includes a display region 2031 and a non-display region 2032 located at the periphery of the display region 2031. As shown, the display region 2031 includes a plurality of gate lines 2033 arranged along an lateral direction, a plurality of data lines arranged along a longitudinal direction, and a pixel (not shown) that is defined at a position formed by intersecting the gate lines 2033 with the data lines 2034. As also shown, the display region 2031 further includes a plurality of touch electrodes 205 insulated from each other and a plurality of touch leads 2051 electrically connected to plurality of touch electrodes 205 respectively. Gate scanning signals transmitted to the gate lines 2033 are provided by a shift register (not shown) in the non-display region 2032, data signals transmitted to the data lines 2034 and touch signals transmitted to the touch electrodes 205 are both provided by an integrated circuit board 2035 located on the substrate 203, which is not described herein in detail.

It should be appreciated that in the top view of the array substrate as shown in FIG. 2, in order to facilitate description, only eight gate lines 2033 arranged along the lateral direction and six data lines 2034 arranged along the longitudinal direction are illustratively shown in FIG. 2. Also, twelve touch electrodes 205 and twelve touch leads 2051 electrically connected to the touch electrodes 205 respectively are illustratively shown in FIG. 2. However, it should be understood that the numbers and types of the gate lines, the data lines, the touch leads and the touch electrodes can be arranged according to actual requirements, and are not limited herein.

Figure 3A:
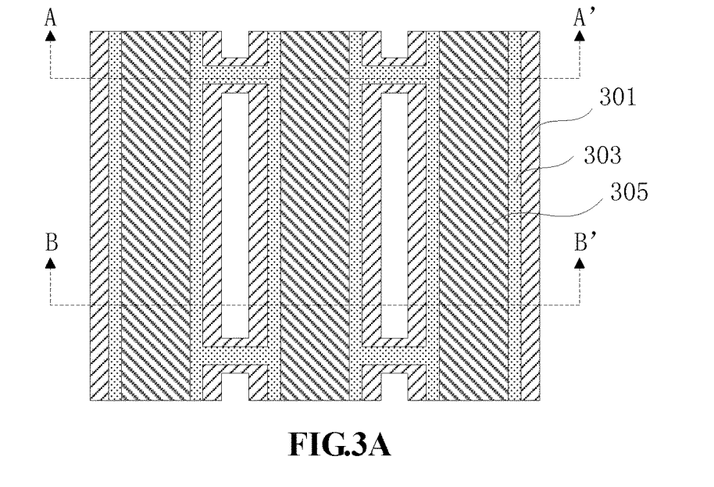
FIG. 3A is a top view of the wirings in a non-display region according to an embodiment of the present disclosure.
Figure 3B:
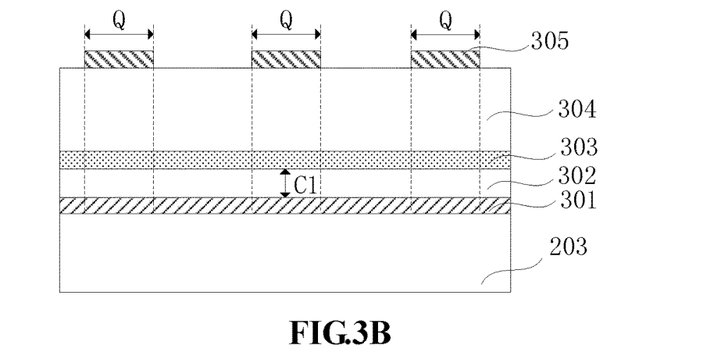
FIG. 3B is a sectional view taken along a cut line AA' in FIG. 3A.
Figure 3C:
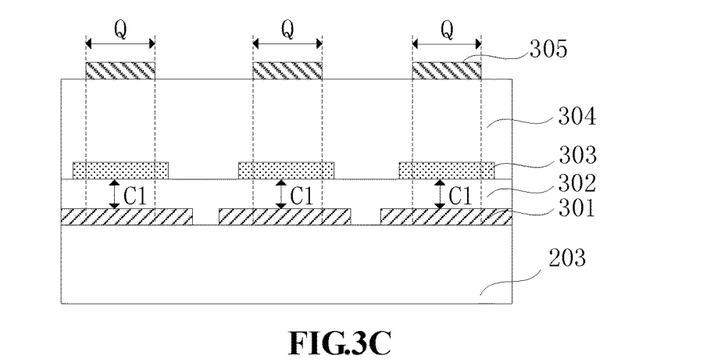
FIG. 3C is a sectional view taken along a cut line BB' in FIG. 3A.

With reference to FIG. 2, attention is now directed to FIGS. 3A, 3B and 3C. FIG. 3A is a top view of the wirings in a non-display region according to an embodiment of the present disclosure, FIG. 3B is a sectional view taken along a cut line AA' in FIG. 3A, and FIG. 3C is a sectional view taken along a cut line BB' in FIG. 3A. As shown, an non-display region 2032 in the substrate 203 includes a first polar plate 301 of a first capacitor and a second polar plate 303 of the first capacitor, a first insulation layer 302 is provided between the first polar plate 301 of the first capacitor and the second polar plate 303 of the first capacitor, such that the first capacitor C1 is formed by overlapping the first polar plate 301 of the first capacitor with the second polar plate 302 of the first capacitor in a direction perpendicular to the substrate 203. Further, the non-display region 2032 further includes a first signal bus 305. As shown, a second insulation layer 304 is provided between the first signal bus 305 and the second polar plate 303 of the first capacitor, and the first signal bus 305 is partially overlapped with the projections of the first polar plate 301 of the first capacitor and the second polar plate 303 of the first capacitor in the direction perpendicular to the substrate 203. Referring now to 3C, the projection of the first capacitor 303 and the projections of the first polar plate 301 of the first capacitor and the second polar plate 303 of the first capacitor in the direction perpendicular to the substrate 203 have an overlapping region Q. As such, the first signal bus 305 is arranged to be partially overlapped with the projections of the first polar plate 301 of the first capacitor and the second polar plate 303 of the first capacitor in the direction perpendicular to the substrate 203. In such a design, the area occupation of the signal bus in the non-display region can be saved, and a narrow-frame can be achieved. The second insulation layer 304 may have a thickness greater larger than a thickness of the first insulation layer 302. In such a design, the first signal bus is further prevented from affecting the first capacitor C1 formed by the second polar plate 303 of the first capacitor and the first polar plate 301 of the first capacitor.

Figure 3D:
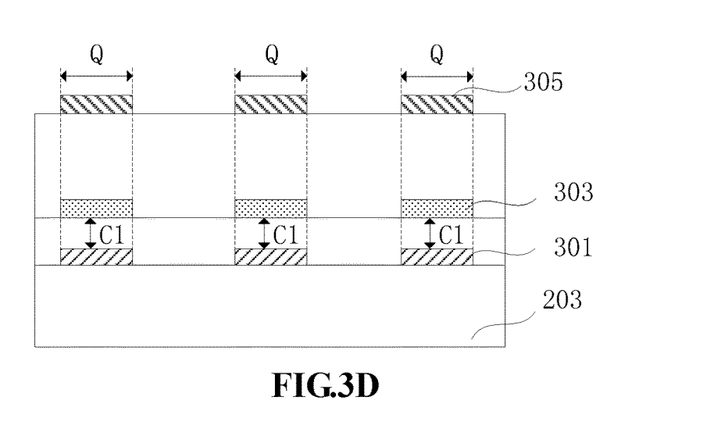
FIG. 3D is a sectional view of the wirings in a non-display region according to an embodiment of the present disclosure.

It should be appreciated that in the top view and sectional view of the wirings as shown in FIGS. 3A, 3B and 3C, the projection of the first signal bus 305 is partially overlapped with the projections of the first polar plate of the first capacitor 301 and the second polar plate of the first capacitor 303 in the direction perpendicular to the substrate 203. However, the partial overlapping shown in the figure is merely illustrative and thus not intended to be limiting. When the first signal bus 305 is made of metal material, the first signal bus 305 may be completely overlapped with the projections of the first polar plate 301 of the first capacitor and the second polar plate 303 of the first capacitor in the direction perpendicular to the substrate 203. The specific shape can be referenced in FIG. 3D. FIG. 3D is a sectional view showing the wirings in a non-display region according to an embodiment of the present disclosure. As shown, the first signal bus 305 has a shape same to shapes of the first polar plate 301 of the first capacitor and the second polar plate 303 of the first capacitor. As still shown, each of the first signal bus 305, the first polar plate of the first capacitor 301 and the second polar plate of the first capacitor 303 has a shape of long strips separated from each other. Referring back to FIG. 3A, the first polar plate 301 of the first capacitor and the second polar 303 plate of the first capacitor adjacent to the first polar plate 301 of the first capacitor are electrically connected to each other so as to form a same potential. In such a design, the first signal bus 305 is made of the metal material and the projection of first signal bus 305 is completely overlapped with the projections of the first polar plate of the first capacitor 301 and the second polar plate of the first capacitor 303 in the direction perpendicular to the substrate 203, so that the narrow-frame can be achieved and also the delay of the signal transmission can be avoided. In such a design, the light transmittance of the non-display region of the touch panel can be improved and the curing effect of adhesive for sealing frames on the non-display region can be affected.

It should be appreciated that the gate lines and data lines in the display region are generally made of metal materials. The first signal bus 305 can be made of transparent metal materials, such as tin indium oxide or indium oxide. In the case that the first signal bus is made of the transparently metal materials. The sheet resistance (that is, ohm per square) of the first signal bus may be same to or approximate to the sheet resistance of the metal materials used for manufacturing the gate lines and data lines. For achieving this, one method is to increase the thickness of the transparent metal materials, which is not limited herein. In such a design, the light transmittance of the non-display region of the touch panel and the curing effect of adhesive for sealing frames on the non-display region can further be improved.

Figure 4A:
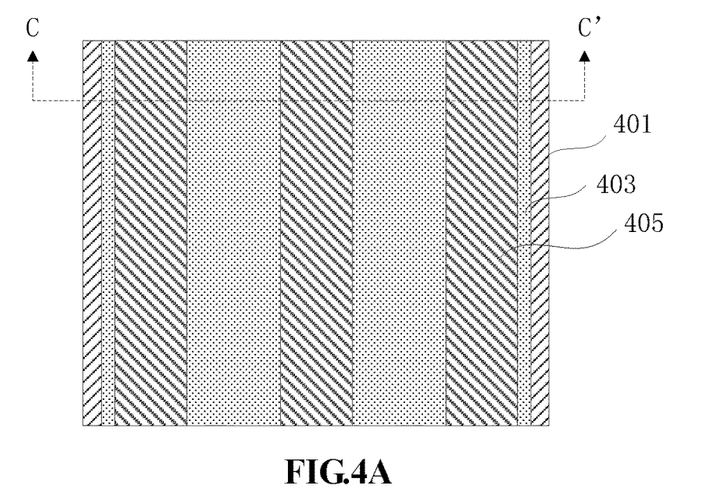
FIG. 4A is a sectional view of the wirings in a non-display region according to another embodiment of the present disclosure.
Figure 4B:
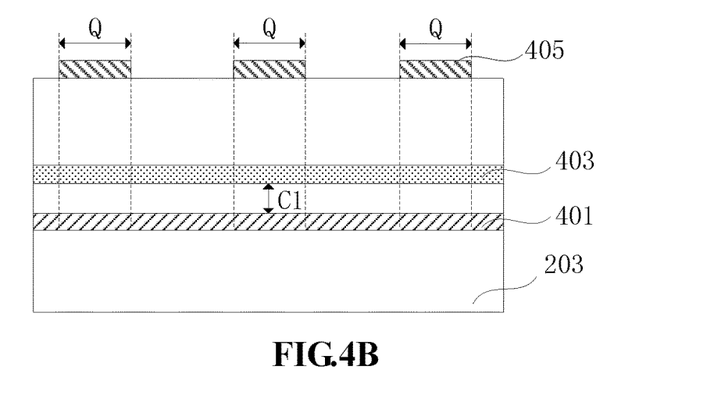
FIG. 4B is a sectional view taken along a cut line CC' in FIG. 4A.

The first signal bus 305 may have a different shape from a shape of the first polar plate 301 of the first capacitor and the second polar plate 303 of the first capacitor. Referring now to FIGS. 4A and 4B, FIG. 4A is a sectional view showing the wirings in another non-display region according to an embodiment of the present disclosure, and FIG. 4B is a sectional view taken along a cut line CC' in FIG. 4A. As shown, the structure of the embodiment in FIG. 4A and FIG. 4B is basically the same as the structure of the embodiment shown in FIGS. 3A, 3B and 3C, except that the projection of the first signal bus 405 has a shape of long strips separated from each other on the direction perpendicular to the substrate 203. As still shown, the projections of the first polar plate 401 of the first capacitor and the second polar plate 403 of the first capacitor has a flat shape on the direction perpendicular to the substrate 203, and the projection of the first signal bus 405 has an overlapping region Q (that is, partial overlapping) with the projections of the first polar plate 401 of the first capacitor and the second polar plate 403 of the first capacitor in the direction perpendicular to the substrate 203. In such a design, the projections of the first polar plate 401 of the first capacitor and the second polar plate 403 of the first capacitor have a flat shape on the direction perpendicular to the substrate 203, so that a capacitance formed between the first polar plate 401 of the first capacitor and the second polar plate 403 of the first capacitor can reach a maximum value, thereby improving the storage capacity of the capacitor in the shift register unit in the non-display region.

It should be appreciated that in the wiring structure of the non-display region according to an embodiment of the present disclosure, the first polar plate of the first capacitor, the second polar plate of the first capacitor and the first signal bus may be made of the same material and may be manufactured using the same process. Generally, the gate lines, the data lines and the touch leads in the display region are located at different layers and are arranged in an increasing distance from the substrate, where the touch leads in the display region may be manufactured in the same layer with touch electrodes and directly electrically connected to the touch electrodes, respectively. Alternatively, the touch leads in the display region may also be manufactured in different layers with touch electrodes and electrically connected to the touch electrodes via the through-holes, respectively, which is not limited herein. The first polar plate of the first capacitor in the non-display region may be manufactured in the same layer with the gate lines in the display region. That is, both may be made of the same material and manufactured by the same process. Similarly, the second polar plate of the first capacitor in the non-display region may be manufactured in the same layer with the data lines in the display region; and the first signal bus in the non-display region can be manufactured in the same layer with the touch leads in the display region. In such a design, the process step can be saved and the manufacturing cost can be saved.

It should be noted that for the plurality of signal bus in the non-display region, different signal buses transmit different signals, and according to circuit structures of the different shift register, signals transmitted by the signal buses can be different depending on the different circuit structures. In terms of the design of the shift register, the shift register generally includes a thin film transistor and a capacitor. The number of thin film transistors and capacitors can be different due to different circuit structures of the shift registers. Accordingly, various implementations can be achieved. For example, in some implementations, two polar plates of the capacitor each may not be electrically connected to the plurality of signal buses. That is, in those implementations, the capacitor may not directly receive signals from the signal buses. In such a circumstance, referring back to FIGS. 3A, 3B and 3C again, the circuit structure of the shift register (not shown) generally includes a first capacitor C1 formed by the first polar plate 301 of the first capacitor and the second polar plate 303 of the first capacitor, but the first capacitor C1 is not directly electrically connected to any of the plurality of signal buses. That is, the first signal bus 405 is not electrically connected to the first polar plate 401 of the first capacitor or the second polar plate 403 of the first capacitor.

Figure 5A:
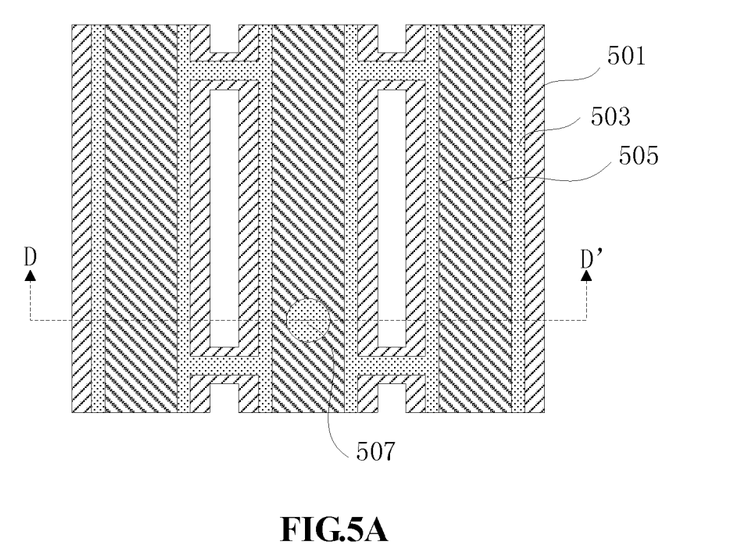
FIG. 5A is a sectional view of the wirings in a non-display region according to still another embodiment of the present disclosure.
Figure 5B:
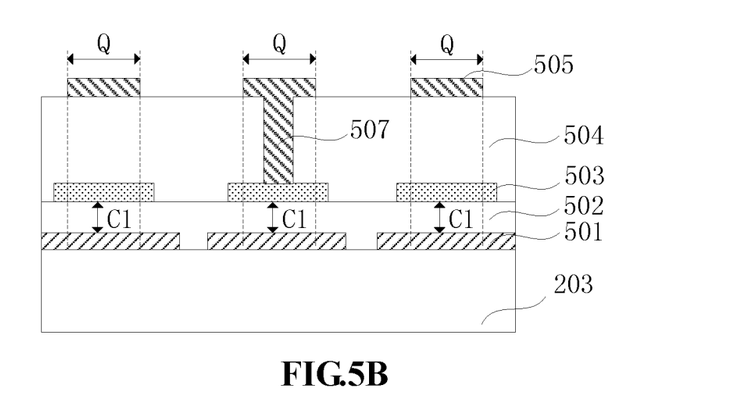
FIG. 5B is a sectional view taken along a cut line DD' in FIG. 5A.

However, in some other implementations, the shift register can include one capacitor, and one of two polar plates of the capacitor is directly connected to one of the plurality of signal buses. That is, in those implementations, one polar plate of the capacitor can directly receive signals from the signal buses. In this circumstance, referring now to FIGS. 5A and 5B, FIG. 5A is a sectional view showing the wirings in a non-display region according to still another embodiment of the present disclosure. FIG. 5B is a sectional view taken along a cut line DD' in FIG. 5A. As shown, the structure of the embodiment shown in FIG. 5A and FIG. 5B is basically identical to the structure of the embodiment shown in FIGS. 3A, 3B and 3C, except that in FIGS. 5A and 5B, an insulation layer 504 also includes a second through-hole 507 which exposes a portion of the second polar plate 503 of the first capacitor, and the first signal bus 505 is electrically connected to the second polar plate 503 of the first capacitor through the second through-hole 507. In such a design, a signal in a certain signal bus of the plurality of signal buses in the non-display region can be transmitted to a polar plate of the capacitor.

Figure 6A:
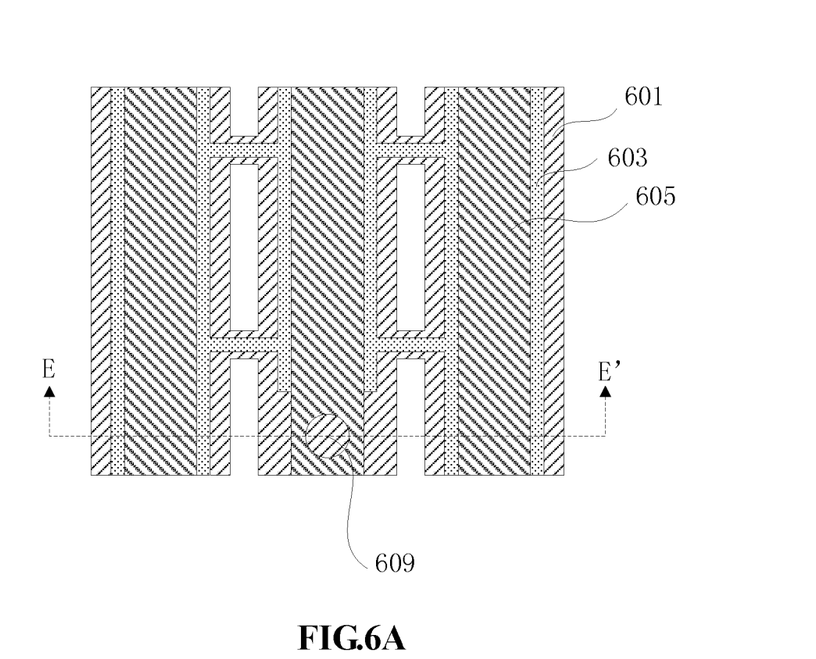
FIG. 6A is a sectional view of the wirings in a non-display region according to still another embodiment of the present disclosure.
Figure 6B:
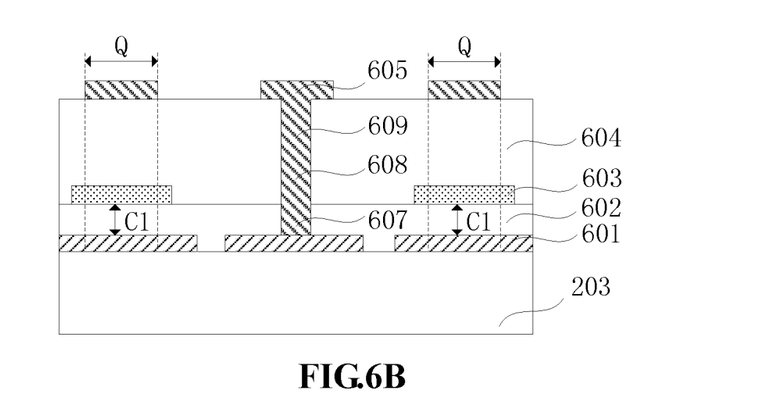
FIG. 6B is a sectional view taken along a cut line EE' in FIG. 6A.

Similarly, referring to FIGS. 6A and 6B, FIG. 6A is a sectional view of the wirings in a non-display region according to still another embodiment of the present disclosure. The structure of the embodiment shown in FIG. 6A and FIG. 6B is basically identical to the structure of the embodiment shown in FIGS. 5A and 5B, except that in FIGS. 6A and 6B, a first insulation layer 602 has a first through-hole 607, and a second insulation layer 604 has a second through-hole 608. As shown, the first through-hole 607 and the second through-hole 608 jointly form a third through-hole 609 which exposes the first polar plate of the first capacitor 601, and the first signal bus 605 is electrically connected to the first polar plate 601 of the first capacitor through the third through-hole 609. In such a design, a signal in a certain signal bus of the plurality of signal buses in the non-display region can be transmitted to a polar plate of the capacitor.

Figure 7A:
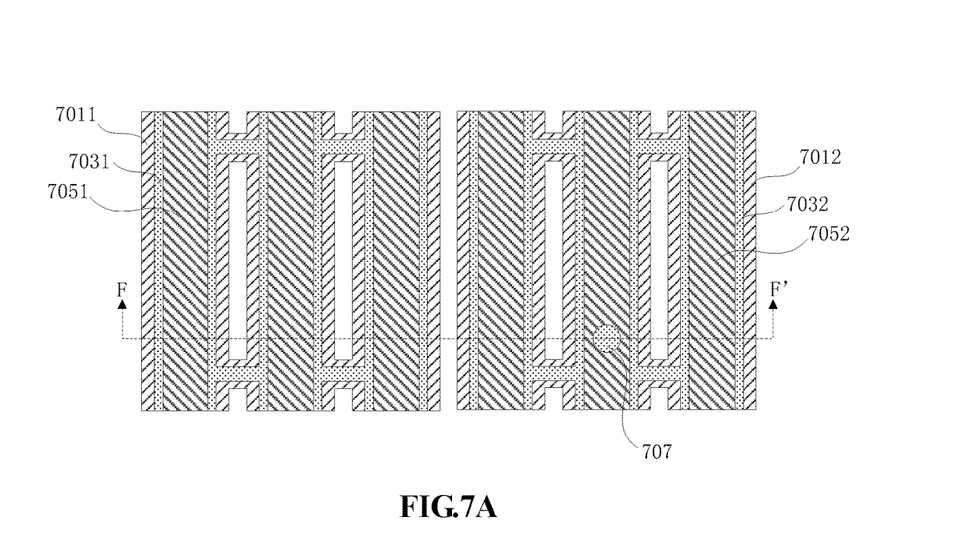
FIG. 7A is a sectional view of the wirings in a non-display region according to still another embodiment of the present disclosure.
Figure 7B:
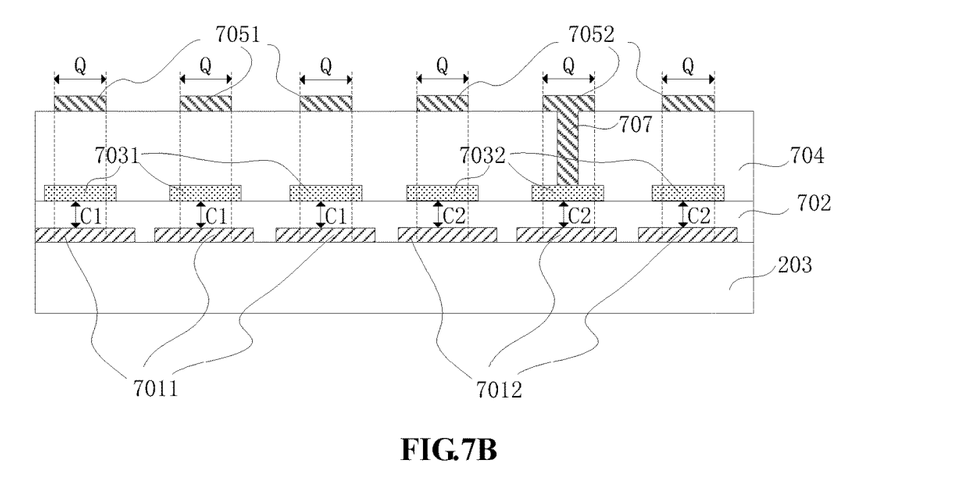
FIG. 7B is a sectional view taken along a cut line FF' in FIG. 7A.

It should also be appreciated that in the circuit structures of some shift registers, there can be at least two capacitors, namely a first capacitor and a second capacitor. In those structures, any one of the two polar plates of one of the capacitors can be directly connected to any one of the plurality of signal buses. That is, one polar plate of the capacitor can directly receive signals from the signal buses; and each of the two polar plates of the other capacitor may not be directly electrically connected to any one of the plurality of buses. As shown, the two polar plates of the other capacitor both may not receive signals from the plurality of signal buses. Referring now to FIGS. 7A and 7B, FIG. 7A is a sectional view of the wirings in a non-display region according to still another embodiment of the present disclosure, and FIG. 7B is a sectional view taken along a cut line FF' in FIG. 7A. As shown, with reference to FIG. 2, non-display region of the substrate 203 can include a first polar plate 7011 of a first capacitor and a second polar plate 7031 of the first capacitor, and can further include a first polar plate 7012 of a second capacitor and a second polar plate 7032 of the second capacitor. As shown, a first insulation layer 702 can be provided between the first polar plate 7011 of the first capacitor and the second polar plate 7031 of the first capacitor and between the first polar plate 7012 of the second capacitor and the second polar plate 7032 of the second capacitor. As still shown, the first capacitor C1 can be formed by overlapping the first polar plate 7011 of the first capacitor with the second polar plate 7013 of the first capacitor in a direction perpendicular to the substrate 203, and the second capacitor C2 can be formed by overlapping the first polar plate 7012 of the second capacitor with the second polar plate 7032 of the second capacitor in a direction perpendicular to the substrate 203. As still shown, the first polar plate 7011 of the first capacitor and the second polar plate 7013 of the first capacitor can be electrically insulated from the first polar plate 7012 of the second capacitor and the second polar plate 7032 of the second capacitor, respectively. As shown, the non-display region further can include a first signal bus 7051 and a second signal bus 7052, and a second insulation layer 704 can be provided between the first signal bus 7051 and the second polar plate 7031 of the first capacitor and between the second signal bus 7052 and the second polar plate 7032 of the second capacitor. The projection of the first signal bus 7051 can be partially overlapped with the projections of the first polar plate 7011 of the first capacitor and the second polar plate 7031 of the first capacitor in a direction perpendicular to the substrate 203, and the projection of the second signal bus 7052 is partially overlapped with the projections of the first polar plate 7012 of the second capacitor and the second polar plate 7032 of the second capacitor in a direction perpendicular to the substrate 203, that is, both of them have an overlapping region Q. The second insulation layer 704 has a second through-hole 707 which exposes the second polar plate 7032 of the second capacitor, and the second signal bus 7052 is electrically connected to the second polar plate 7032 of the second capacitor through the second through-hole 707. In such a design, at least two capacitors are included in the circuit structure of a shift register unit, with a polar plate of one of the two capacitors directly receives signals from the signal bus.

Furthermore, in the embodiment disclosed in FIGS. 7A and 7B, the second signal bus 7052 is electrically connected to the second polar plate 7032 of the second capacitor via the second through-hole 707, which is not limited herein. Alternatively, it is also possible to use the electrical connection manner as shown in FIGS. 6A and 6B, which is not described again in detail. Also, in the embodiment disclosed in FIGS. 7A and 7B, the first polar plate of the first capacitor, the second polar plate of the first capacitor, the first polar plate of the second capacitor, the second polar plate of the second capacitor, the first signal bus and the second signal bus can each have a shape of long strips separated from each other, and an equipotential is formed by the electrical connection between two adjacent long strips of the first polar plate of the first capacitor and the electrical connection between two adjacent long strips of the second polar plate of the first capacitor. In such a design, an equipotential can be formed by the electrical connection between two adjacent long strips of the first polar plate of the second capacitor and the electrical connection between two adjacent long strips of the second polar plate of the second capacitor. Alternatively, other shapes may also be selected, for example the design of the electrode as shown in FIG. 4 may be used, which is not described again in detail.

It should be appreciated that in the above embodiments, the three or six signal buses are illustratively described, but the specific amount of the signal buses are not intended to be limited to the embodiments described and illustrated herein. One skill in the art will understand the specific amount of the signal buses can be arranged according to actual requirements.

Figure 8:
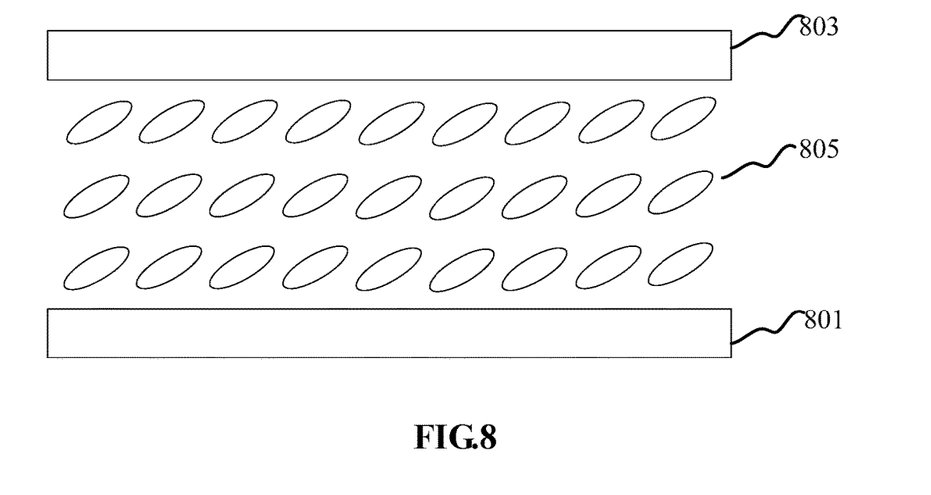
FIG. 8 is a touch display panel according to an embodiment of the present disclosure.

Referring to FIG. 8, FIG. 8 is a touch display panel according to an embodiment of the present disclosure, including a low substrate 801, an upper substrate 803 and a liquid crustal layer located there between. As shown, the structure of the non-display region of the low substrate 801 of the touch display panel can be referred to the aforementioned disclosed designs of the array substrate, which is not described in detail. It should be appreciated that the touch display panel as shown in FIG. 8 only uses the liquid crystal panel illustratively and the touch display panel may be used as other types, such as an organic light-emitting display panel.

Figure 9:
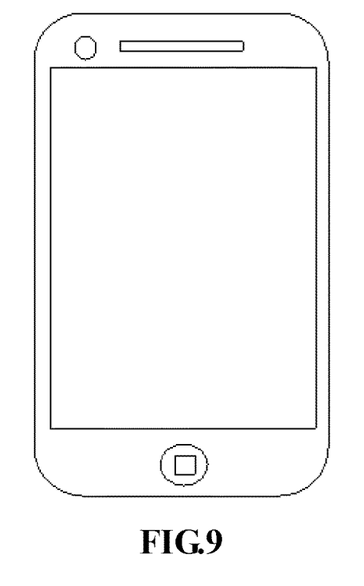
FIG. 9 is a touch display device according to an embodiment of the present disclosure.

Referring to FIG. 9, FIG. 9 is a touch display device according to an embodiment of the present disclosure. The touch display device includes the touch display panel as shown in FIG. 8. It should be understood that the touch display device is not limited to a phone, and it can be a tablet and so on.

According to the array substrate, touch display panel and the touch display device provided in the present disclosure, the signal bus in the non-display region is arranged to be partially overlapped with the capacitor in the non-display region in a direction perpendicular to the substrate, thereby further realizing the narrow-frame design.

Although some embodiments and the applied technology principles of the present disclosure have been described as above, it should be understood by those skilled in the art that the present disclosure is not limited to particular embodiments described herein. Various modifications, readjustment and alternations can be made by those skilled in the art without departing the scope of protection of the present disclosure, and these modifications, readjustment and alternations fall within the scope of the present disclosure which is subject to the appended claims.

The invention claimed is:
1. An array substrate, comprising:
   a substrate comprising a display region and a non-display region, wherein the display region comprises a plurality of gate lines, a plurality of data lines and a plurality of touch leads; and
   a plurality of touch electrodes insulated from each other, with each of the plurality of touch electrodes being electrically connected to a respective one of the plurality of touch leads; and, wherein the non-display region comprises:
a first polar plate of a first capacitor, a second polar plate of the first capacitor and a first signal bus, wherein
the first capacitor is formed by overlapping the first polar plate of the first capacitor with the second polar plate of the first capacitor in a direction perpendicular to the substrate, and
the first signal bus is partially overlapped with the first polar plate of the first capacitor and the second polar plate of the first capacitor in the direction perpendicular to the substrate,
wherein the first polar plate of the first capacitor and the gate lines are manufactured in a same layer, the second polar plate of the first capacitor and the data lines are manufactured in a same layer, and the first signal bus and the touch leads are manufactured in a same layer.

2. The array substrate of claim 1, further comprising a first insulation layer and a second insulation layer, wherein the first insulation layer is provided between the first polar plate of the first capacitor and the second polar plate of the first capacitor, and the second insulation layer is provided between the first signal bus and the second polar plate of the first capacitor.

3. The array substrate of claim 2, wherein
the first insulation layer has a first through-hole, the second insulation layer has a second through-hole, and the first through-hole and the second through-hole jointly form a third through-hole which exposes a portion of the first polar plate of the first capacitor, and
the first signal bus is electrically connected to the first polar plate of the first capacitor through the third through-hole.

4. The array substrate of claim 2, wherein the second insulation layer has a second through-hole which exposes a portion of the second polar plate of the first capacitor, and the first signal bus is electrically connected to the second polar plate of the first capacitor through the second through-hole.

5. The array substrate of claim 1, further comprising a first polar plate of a second capacitor, a second polar plate of the second capacitor and a second signal bus, wherein
the second capacitor is formed by overlapping the first polar plate of the second capacitor with the second polar plate of the second capacitor in a direction perpendicular to the substrate, and
the second signal bus is partially overlapped with the first polar plate of the second capacitor and the second polar plate of the second capacitor in the direction perpendicular to the substrate.

6. The array substrate of claim 5, further comprising a first insulation layer and a second insulation layer, wherein the first polar plate of the first capacitor is electrically insulated from the first polar plate of the second capacitor, and the second polar plate of the first capacitor is electrically insulated from the second polar plate of the second capacitor, wherein
the first insulation layer is provided between the first polar plate of the first capacitor and the second polar plate of the first capacitor and between the first polar plate of the second capacitor and the second polar plate of the second capacitor, and
the second insulation layer is provided between the first signal bus and the second polar plate of the first capacitor and between the second signal bus and the second polar plate of the second capacitor.

7. The array substrate of claim 6, wherein
the first insulation layer has a first through-hole, the second insulation layer has a second through-hole, and the first through-hole and the second through-hole jointly form a third through-hole which exposes a portion of the first polar plate of the second capacitor, and
the second signal bus is electrically connected to the first polar plate of the second capacitor through the third through-hole.

8. The array substrate of claim 6, wherein
the second insulation layer has a second through-hole, the second through-hole exposes a portion of the second polar plate of the second capacitor, and
the second signal bus is electrically connected to the second polar plate of the second capacitor through the second through-hole.

9. The array substrate of claim 5, wherein the first signal bus, the second signal bus and the touch leads are all made of metal materials.

10. The array substrate of claim 9, wherein
a pattern of the first polar plate of the first capacitor, a pattern of the second polar plate of the first capacitor, and a pattern of the first signal bus are the same,
projections of the first polar plate of the first capacitor and the second polar plate of the first capacitor are completely overlapped with a projection of the first signal bus in a direction perpendicular to the substrate,
a pattern of the first polar plate of the second capacitor, a pattern of the second polar plate of the second capacitor, and a pattern of the second signal bus are the same, and
projections of the first polar plate of the second capacitor and the second polar plate of the second capacitor are completely overlapped with a projection of the second signal bus in a direction perpendicular to the substrate.

11. The array substrate of claim 5, wherein the gate lines and data lines are both made of metal, and the first signal bus, the second signal bus and the touch leads are made of transparent metal materials having a sheet resistance that is the same as a sheet resistance of the gate lines and data lines.

12. The array substrate of claim 11, wherein patterns of the first polar plate of the first capacitor and the second polar plate of the first capacitor are different from a pattern of the first signal bus, and projections of the first polar plate of the first capacitor and the second polar plate of the first capacitor are partially overlapped with a projection of the first signal bus in a direction perpendicular to the substrate;
patterns of the first polar plate of the second capacitor and the second polar plate of the second capacitor are different from a pattern of the second signal bus, and projections of the first polar plate of the second capacitor and the second polar plate of the second capacitor are partially overlapped with a projection of the second signal bus in a direction perpendicular to the substrate.

13. A touch display panel, comprising:
an array substrate, comprising:
a substrate comprising a display region and a non-display region, wherein the display region comprises a plurality of gate lines, a plurality of data lines and a plurality of touch leads; and
a plurality of touch electrodes insulated from each other, with each of the plurality of touch electrodes being electrically connected to a respective one of the plurality of touch leads; and, wherein the non-display region comprises:

a first polar plate of a first capacitor, a second polar plate of the first capacitor and a first signal bus, wherein the first capacitor is formed by overlapping the first polar plate of the first capacitor with the second polar plate of the first capacitor in a direction perpendicular to the substrate, and the first signal bus is partially overlapped with the first polar plate of the first capacitor and the second polar plate of the first capacitor in the direction perpendicular to the substrate, wherein the first polar plate of the first capacitor and the gate lines are manufactured in a same layer, the second polar plate of the first capacitor and the data lines are manufactured in a same layer, and the first signal bus and the touch leads are manufactured in a same layer.

14. A touch display device, comprising:
a touch display panel, comprising:
an array substrate, comprising:
a substrate comprising a display region and a non-display region, wherein the display region comprises a plurality of gate lines, a plurality of data lines and a plurality of touch leads; and a plurality of touch electrodes insulated from each other, with each of the plurality of touch electrodes being electrically connected to a respective one of the plurality of touch leads; and, wherein the non-display region comprises:

a first polar plate of a first capacitor, a second polar plate of the first capacitor and a first signal bus, wherein the first capacitor is formed by overlapping the first polar plate of the first capacitor with the second polar plate of the first capacitor in a direction perpendicular to the substrate, and the first signal bus is partially overlapped with the first polar plate of the first capacitor and the second polar plate of the first capacitor in the direction perpendicular to the substrate, wherein the first polar plate of the first capacitor and the gate lines are manufactured in a same layer, the second polar plate of the first capacitor and the data lines are manufactured in a same layer, and the first signal bus and the touch leads are manufactured in a same layer.

* * * * *